(12) United States Patent
Mehr (10) Patent No.: US 7,237,619 B2
(45) Date of Patent: Jul. 3, 2007

(54) AUTOMATIC FIRE SPRINKLER HAVING A VARIABLE ORIFICE

(76) Inventor: Ralph R. Mehr, P.O. Box 21666, 61216 Tel Aviv (IL)

( * ) Notice: Subject to any disclaimer, the term of this patent is extended or adjusted under 35 U.S.C. 154(b) by 139 days.

(21) Appl. No.: 10/624,473

(22) Filed: Jul. 23, 2003

(65) Prior Publication Data

US 2005/0017095 A1 Jan. 27, 2005

(51) Int. Cl.
*A62C 37/08* (2006.01)

(52) U.S. Cl. ............... 169/37; 169/19; 169/20; 169/5; 169/8; 169/16; 239/569; 239/570; 239/546; 137/859; 137/849

(58) Field of Classification Search ............... 169/19, 169/20, 5, 8, 16, 37, 57, 90; 251/5; 137/859, 137/849, 843; 239/284.1, 284.2, 546, 456, 239/541, 579, 602, DIG. 12
See application file for complete search history.

(56) References Cited

U.S. PATENT DOCUMENTS

| | | | | | |
|---|---|---|---|---|---|
| 2,593,315 | A | * | 4/1952 | Kraft | 138/45 |
| 3,072,288 | A | * | 1/1963 | Lemmer | 220/89.2 |
| 3,759,331 | A | * | 9/1973 | Livingston | 169/17 |
| 3,871,457 | A | * | 3/1975 | Livingston | 169/20 |
| 3,895,646 | A | * | 7/1975 | Howat | 137/468 |
| 4,553,602 | A | * | 11/1985 | Pieczykolan | 169/19 |
| 5,323,963 | A | * | 6/1994 | Ballu | 239/63 |

* cited by examiner

*Primary Examiner*—Dinh Q. Nguyen
(74) *Attorney, Agent, or Firm*—Mark M. Friedman

(57) ABSTRACT

An automatic fire sprinkler having a variable orifice, the sprinkler having a variable orifice associated with the automatic fire sprinkler, and wherein the orifice is responsive to the water inlet pressure of the sprinkler.

23 Claims, 5 Drawing Sheets

AUTOMATIC FIRE SPRINKLER HAVING A VARIABLE ORIFICE

FIELD AND BACKGROUND OF THE INVENTION

The present invention relates to automatic fire sprinklers, and more particularly, to automatic fire sprinklers having a variable, self-adjusting orifice for improving the performance of the sprinkler by changing the amount and flow-rate of the discharged water.

Typically, an automatic fire sprinkler includes a body with a base, an inlet connected to a source of pressurized water, or fire retardant fluid, and an outlet, both defined by the base, a passageway between the inlet and outlet, and a flow-adjusting orifice, usually located upstream close to the outlet. Additionally, a plug closing the outlet when the sprinkler is in standby condition is held in place by a thermally sensitive element. When the temperature is elevated to a pre-determined value, the thermally sensitive element disintegrates. Consequently, the water pressure urges the plug away from the outlet, enabling the sprinkler to discharge. A supported deflector distributes the water stream flowing from the outlet, dispersing the stream over the region to be protected by the sprinkler.

The various requirements of automatic fire sprinklers are defined in the National Fire Protection Association (NFPA) 13 Standard for the Installation of Sprinkler Systems, which was also adopted by American National Standards Institute (ANSI). The NFPA standard includes the minimum required amount of water for extinguishing a fire in a specified area of the fire source. This specified area of the fire source is empirically determined by standard tests according to the hazard occupancy of goods in a warehouse.

Generally, the water flow rate "Q" from a sprinkler is determined by the formula:

$$Q = K^*(p)^{1/2}$$

where "K" represents the nominal sprinkler discharge coefficient, known as the K-factor, and "p" represents the pressure at the inlet to the sprinkler. The K-factor of a given sprinkler, which mainly depends on the orifice dimensions, is determined by standard flow testing.

Different applications require different water flows, i.e., sprinklers that have different K-factors, and/or different inlet water pressures. For standard coverage, the most commonly used sprinklers have a K-factor of 5.6, while extended coverage applications use sprinklers having larger K-factors of 8 to 11.2, which have correspondingly larger orifices.

An advanced sprinkler, developed during the last two decades, is the low-pressure fast response (LPFR) sprinkler, also known as the early suppression fast response (ESFR) sprinkler. Characteristically, this sprinkler has K-factors between 14 and 25.2, a short time of response, and high water flow rates. Typical prior art examples of these LPFR or ESFR sprinklers are U.S. Pat. No. 5,829,532 and U.S. Pat. No. 6,502,643, both to Meyer, et al., U.S. Pat. No. 6,059,044 to Fischer, and U.S. Pat. No. 6,336,509 to Polan, et al. As will be developed in greater detail hereinbelow, the use of sprinklers having greater K-factors reduces the required water pressure at the inlet, and therefore obviates the need of installing more robust and capital-intensive systems that also require more electrical power and maintenance.

In addition, a lower water pressure results in larger droplets being produced by the deflector. The larger droplets have a higher momentum that assists them in being deflected further from the sprinkler, thereby extending the coverage area.

Alternatively, for a given water pressure, the use of sprinklers having larger orifices increases the flow of water through each sprinkler, thus reducing the required number of sprinklers for the requisite coverage area.

In prior art sprinkler systems, after a fire starts, the thermally sensitive element of the closest sprinkler disintegrates at the pre-determined temperature, permitting $Q_1$ of water to discharge at inlet pressure $p_1$. If the fire has not been extinguished by this sprinkler, additional heat is evolved and spreads, and a second sprinkler discharges. As a result, $Q_1$ and $p_1$ of the first sprinkler decrease to $Q_2$ and $p_2$, since now the same water source is feeding two sprinklers. As additional sprinklers discharge, the values of Q and p of the first and second sprinklers further decrease. Final Q and p values are reached only when no additional sprinklers discharge.

Since the K-factor in all prior art sprinklers is constant and the value of the inlet pressure p changes according to the number of discharging sprinklers, the amount of water discharged by the first sprinkler, according to the above mentioned formula, is $Q_1 = K^*(p_1)^{1/2}$, $Q_2 = K^*(p_2)^{1/2}$ etc. Consequently, in the first stage of the operational pattern, the amounts $Q_1$ and $Q_2$ are greater than the amount discharged by the first-opened sprinkler when more sprinklers are in operation.

The efficacy of existing automatic fire sprinkler systems notwithstanding, it would be highly advantageous to have an improved automatic fire sprinkler system that discharges the requisite amount of water for extinguishing a fire with a decreased number of sprinklers, such that the capital cost for the sprinklers and auxiliary equipment, such as water tanks and pressure pumps, would be greatly reduced. It would be of further advantage if such a system would reduce the water damage caused by current systems. It would be yet of further advantage if the improved performance of the sprinkler system could be obtained in a simple, efficient, and cost-effective fashion, both in new systems and by retrofitting of existing systems.

SUMMARY OF THE INVENTION

According to the teaching of the present invention there is provided an automatic fire sprinkler having a variable orifice, the sprinkler including a variable orifice associated with the automatic fire sprinkler, the orifice being responsive to the water inlet pressure of the sprinkler.

According to another aspect of the invention, there is provided a variable orifice insert for furnishing a pressure dependent flow in a sprinkler of an automatic fire protection system, the insert including a flow-impeding element disposed within the automatic fire protection system and associated with the sprinkler, so as to decrease the cross-sectional area of the water flow-path of the sprinkler as a function of water pressure within the flow-path.

According to one feature of the preferred embodiments of the present invention, the flow-rate of water through the sprinkler is characterized by the formula: $Q = K^*(p)^{1/2}$, wherein Q is the flow-rate of water through the sprinkler, p is the water inlet pressure, and K is a coefficient dependent upon the geometry of the sprinkler and a function of p, and wherein the variable orifice is designed and configured to change the cross-sectional area of the water flow-path of the sprinkler as a function of the water pressure within the flow-path.

According to another feature of the preferred embodiments, the function is substantially linear.

According to yet another feature of the preferred embodiments, the function is substantially parabolic.

According to still another feature of the preferred embodiments, the function is substantially exponential.

According to another feature of the preferred embodiments, the function is substantially of the order 0.5, such that the flowrate is substantially a linear function of pressure.

According to yet another feature of the preferred embodiments of the present invention, the water flow-path is a specific water flow-path.

According to yet another feature of the preferred embodiments, the insert further includes a housing installed in the water flow-path ahead of the sprinkler, the housing for containing the flow-impeding element and for operatively connecting the sprinkler to the automatic fire protection system.

According to still another feature of the preferred embodiments, the flow-impeding element includes a flexible diaphragm attached to the housing.

According to yet another feature of the preferred embodiments of the present invention, the flow-impeding element further includes a damping mechanism for damping movement of the diaphragm, the damping mechanism being responsive to water pressure.

According to yet another feature of the preferred embodiments of the present invention, the damping mechanism includes a piston.

According to yet another feature of the preferred embodiments of the present invention, the damping mechanism includes a spring.

According to still another feature of the preferred embodiments the flow-impeding element is disposed within the sprinkler.

According to yet another feature of the preferred embodiments, a longitudinal cross-section of the flow-impeding element narrows as a function of a longitudinal distance from the base of the element.

According to yet another feature of the preferred embodiments of the present invention, the flow-impeding element is anchored to the sprinkler.

According to still another feature of the preferred embodiments, the flow-impeding element is anchored to an inner wall of the deflector of the sprinkler.

According to still another feature of the preferred embodiments, the flow-impeding element includes a damping mechanism, the damping mechanism being responsive to said water pressure.

According to yet another feature of the preferred embodiments of the present invention, the damping mechanism includes at least one arm, associated with the deflector, for altering the longitudinal distance of the flow-impeding element.

According to still another feature of the preferred embodiments, the damping mechanism further includes at least one spring for damping the motion of the arm.

According to yet another feature of the preferred embodiments of the present invention, the flow-impeding element is operatively connected to the automatic fire protection system, and includes at least one leaf disposed within the water flow-path, the leaf configured so as to decrease the cross-sectional area.

According to still another feature of the preferred embodiments of the present invention, the at least one leaf within the water flow-path is a plurality of leaves.

According to yet another feature of the preferred embodiments, the leaves shares a common base.

According to still another feature of the preferred embodiments, the leaves are radial segments, the plurality of leaves being designed and configured to move from an open configuration towards a closed configuration as a decreasing function of the water pressure, so as to reduce the cross-sectional area of the water flow-path.

Finally, according to yet another feature of the preferred embodiments, the flow-impeding element is self-adjusting, based on the water inlet pressure, so as to decrease the cross-sectional area of the water flow-path as a function of decreasing water pressure within the flow-path.

Thus, the present invention successfully addresses the shortcomings of the prior art by providing an improved automatic fire sprinkler system having sprinklers with varying K-factors that are capable of discharging the needed amount of water for extinguishing a fire with a decreased number of sprinklers, thus minimizing the damages usually caused by excessive water, as well as the investment in water tanks and pressure pumps. The improved automatic fire sprinkler system is simple, efficient, robust, and cost-effective, both as a new system and as a retrofit of existing systems.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3e is a detailed top view of the conical element of FIG. 3a, and

DESCRIPTION OF THE PREFERRED EMBODIMENTS

The present invention is an automatic fire sprinkler having an orifice that is self-adjusting based on the water inlet pressure, for improving the performance of the sprinkler.

The principles and operation of the system according to the present invention may be better understood with reference to the drawings and the accompanying description.

Both the NFPA 13 Standard for Installation of Sprinkler Systems, 2002 edition, section A.12.1.12, and the Automatic Sprinkler Systems Handbook, (Editor: Christian Dubay) 2002 edition, recommend the use of larger orifice sprinklers in storage situations, based on a number of fire tests that show a distinct advantage of these sprinklers (K-11.2 and K-16) over K-5.6 and K-8 sprinklers.

Hereinbelow there is provided a short summary of four sets of fire test comparisons using constant water coverage densities.

In the first set, idle wood two-way pallets, 2 stacks×3 stacks×8 ft high were used in the fire test. The ceiling and sprinklers heights were 30 ft and 29 ft, respectively. The water density was 0.30 gpm/ft$^2$, and the thermally sensitive element was rated to break apart at 165° F., allowing the water to discharge. In these tests, 4 automatic K-11.2 sprinklers and 29 automatic K-5.6 sprinklers were operated. Although each K-11.2 sprinkler discharges twice the quantity of a K-5.6 sprinkler, the total amount of water used by the larger K-11.2 sprinklers in extinguishing the flame was only 28% of the amount discharged by the smaller orifice sprinklers.

In the second set, idle wood four-way pallets, 2 stacks×3 stacks×12 ft high were used in the tests. The ceiling and sprinklers heights were identical to those in the first set, as the water density. In the first test, the thermally sensitive elements of K-8 sprinklers were rated to activate at 286° F. Ten sprinklers were temperature-activated, the maximum temperature of the steel ceiling reached 658° C., and the fire spread to all sides. The second test was implemented on K-11.2 sprinklers rated to activate at 165° F. Thirteen sprinklers were activated, the maximum temperature of the steel ceiling reached 94° C., and the fire spread to three sides. In the last test of this set, K-16.8 sprinklers were rated to discharge at 165° F. Six sprinklers were temperature-activated, the maximum steel temperature attained was only 54° C., and the fire reached only one side.

One main conclusion that must be drawn from this set is that the use of larger orifice sprinklers provides superior control of the fire, and also results in the activation of fewer sprinklers for extinguishing the fire.

In the third set, FMRC standard plastic commodity rack style (9 ft high) was used in the fire tests. The ceiling and sprinklers heights were identical to those in the previous sets, while the water density was 0.45 gpm/ft$^2$. In the first test, 29 automatic K-5.6 sprinklers were temperature-activated, and the fire consumed 14 pallet loads. In the second test, by sharp contrast, only 5 K-16.8 sprinklers were triggered, and only 2 pallet loads were consumed. In this set of tests, the total amount of water discharged by the larger orifice sprinklers was about half the amount discharged by the smaller orifice sprinklers for extinguishing the fire, and provided superior extinguishing results.

In the last set, FMRC standard plastic commodity rack style (14 ft high) was used in the fire tests. The ceiling height was 25 ft, the height of the sprinklers was 24 ft, and the water density was 0.60 gpm/ft$^2$. In these tests, 29 automatic K-8.0 sprinklers were activated, and 25 pallet loads were consumed, while only 7 K-16.8 sprinklers were activated and only 4 pallet loads were consumed. Once again, it was demonstrated that sprinklers having larger orifices both dramatically improve the extinguishing performance and reduce the amount of discharged water.

All these fire test comparisons, as well as other test results mentioned in Supplement 2 of the above-referenced Automatic Sprinkler Systems Handbook, show the immense advantages of the larger orifices, especially with sprinklers having lower activating temperatures. It is evident to those skilled in the art that larger K-factors enhance the fire protection and provide better fire adjustment.

Additional economical results of using larger orifice sprinklers are savings in the volume of water reservoirs designated to fire protection, in the lower requirement for water pressure, as well as in decreasing damages to the goods in the sprinkled area due to excessive extinguishing water.

The above-mentioned specified area of the fire source is an important factor in the design of automatic fire protection systems. In calculating the area of the fire source, it is assumed that perfect extinguishing is achieved by uniform sprinkling over the area, considering the characteristic hazard, height, accumulation and quantity of the stored commodity, the material of construction of the warehouse and racks, etc.

Based on statistical results of actual fire occurrences, it is been found that in 27% of the fire tests, fires in areas calculated to require 12 sprinklers are extinguished by a single sprinkler, and in 65% of the tests, 5 sprinklers are sufficient. The percentage of cases in which all 12 sprinklers are needed is negligible.

Based on these tests results, the use of sprinklers of larger K-factors contradicts the demand to install a relatively large number of sprinklers as calculated for the fire source. The sprinkler of the present invention completely implements the above-mentioned recommendation of the NFPA 13 by having greater K-factors, e.g., in the range of K-25.2 to K-28 and above, and mitigates the contradiction by reducing the number of installed sprinklers. This is accomplished by introducing a variable orifice to the automatic fire sprinkler that is directly dependent on the inlet pressure according to the general formula:

$$K=f(p)$$

where f represents any general function of the water inlet pressure p. As the pressure drops, the K-factor is decreased. Thus, as additional sprinklers are activated, the water pressure is lowered and the K-factor becomes reduced.

It should be noted that since the K-factor of the present invention is directly depended on the inlet pressure, the general flow formula changes to:

$$Q=f(p)*(p)^{1/2}$$

The quantity Q of water discharged through the sprinkler is determined by the geometry of the orifice and by the water-pressure at the orifice.

Hereinbelow there are provided several preferred embodiments of sprinklers having variable, self-adjusting orifices. Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

Figures 1A, 1B:
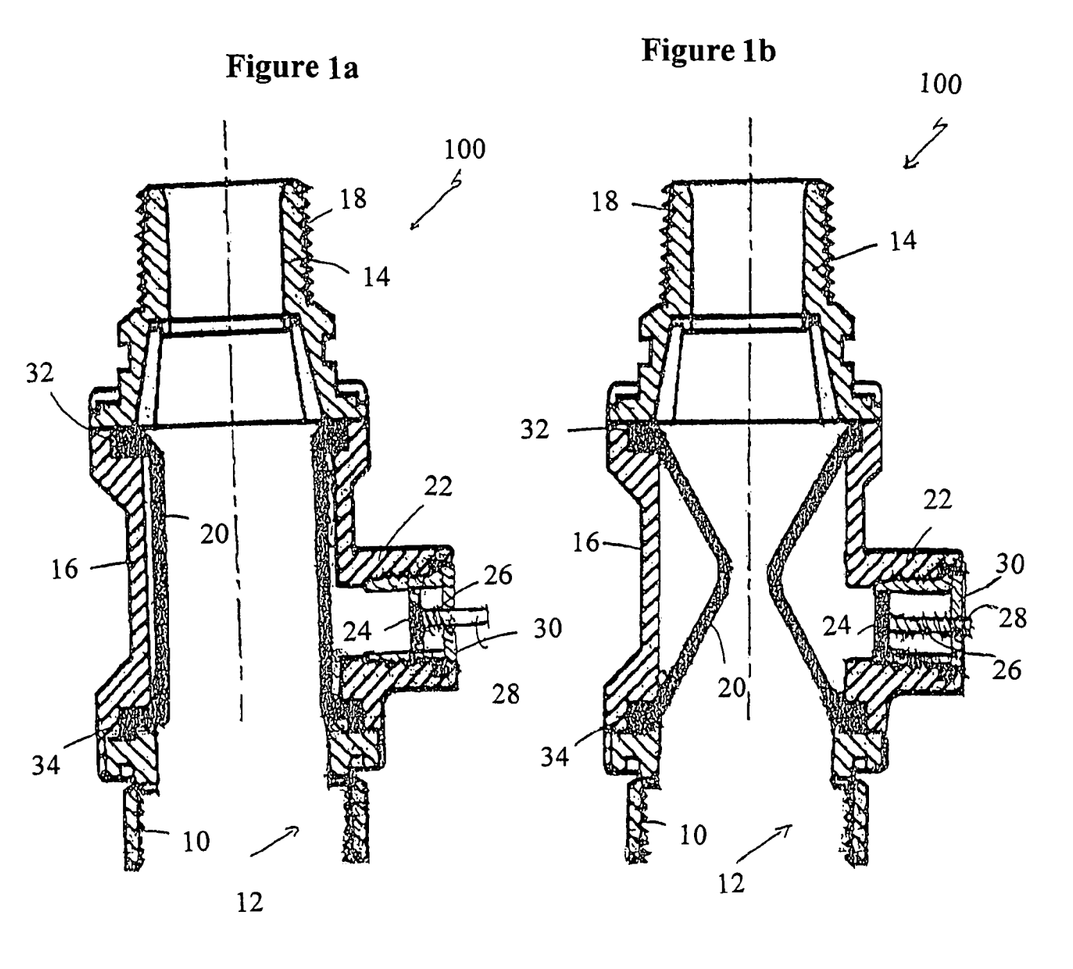
FIG. 1a is a schematic drawing of an inventive fitting in a non-flowing condition, installed ahead of a prior-art fire sprinkler, for adjusting the orifice of the sprinkler as a function of the water inlet pressure.
FIG. 1b schematically depicts the fitting of FIG. 1a in a flowing condition.

Referring now to the drawings, FIGS. 1a and 1b are schematic illustrations of an orifice insert, installed ahead of a prior-art sprinkler, for providing a K-factor that is responsive to the water pressure. FIG. 1a shows the insert in a non-flowing condition; FIG. 1b shows the insert in a flowing condition.

Fitting 100 includes a cylindrical metallic body 16, a base 14 connected by external threading 18 to the water system, and a water outlet 12 at the other end of body 16. The conventional prior-art sprinkler (not shown in the drawing) is attached to fitting 100 at outlet 12 by suitable internal threading 10. A side extension 22, made of the same material as cylindrical body 16, is associated to body 16, forming together, a T-shaped element. Cover 30, through which an arm 28 can freely move, closes side extension 22, which typically has a smaller diameter than body 16. Inside extension 22, a well-sealed piston 24, preferably made of metal or a hard, non-abrasive plastic material, is connected to arm 28 at the internal edge of extension 22. A spiraled spring 26 is disposed around arm 28 between piston 24 and cover 30.

Additionally, a flexible sleeve-like diaphragm 20, generally made of natural or neoprene rubber, or plastic materials such as EPDM, is attached to body 16 of fitting 100, preferably within grooved rings 32 and 34.

In FIG. 1a, the attached sprinkler is not activated, hence, the high static pressure within fitting 100 pushes diaphragm 20 towards the inner walls of body 16. The air trapped in between diaphragm 20 and piston 24 pushes piston 24 outside against spring 26.

When the sprinkler is temperature-activated (see FIG. 1b), water is discharged through the sprinkler, the water pressure within fitting 100 decreases, the trapped air expands, pushing diaphragm 20 away from body 16, thereby reducing the cross-sectional area of the water flow-path of fitting 100 by a predetermined amount. The trapped air ceases to move diaphragm 20 when the force of the air is balanced by the force of spring 26.

When more sprinklers open, water pressure further decreases, causing diaphragm 20 to further depart from body 16, and, thus further reduce the cross-sectional area of the water flow-path.

Fitting 100 is an inexpensive, simple, easy to use device for turning any existing fire extinguishing system into a more efficient and water saving system.

Figure 2A:
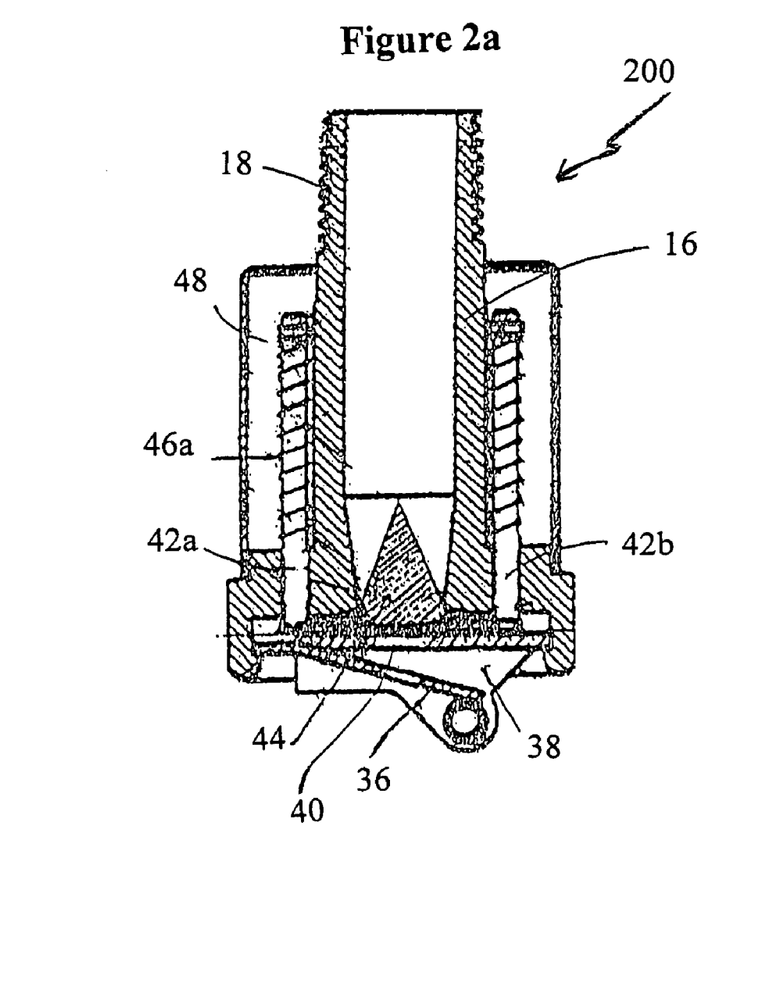
FIG. 2a is a schematic drawing of an innovative automatic fire sprinkler in a non-flowing condition, the sprinkler having a variable orifice adjusted by an inner conical element.
Figure 2B:
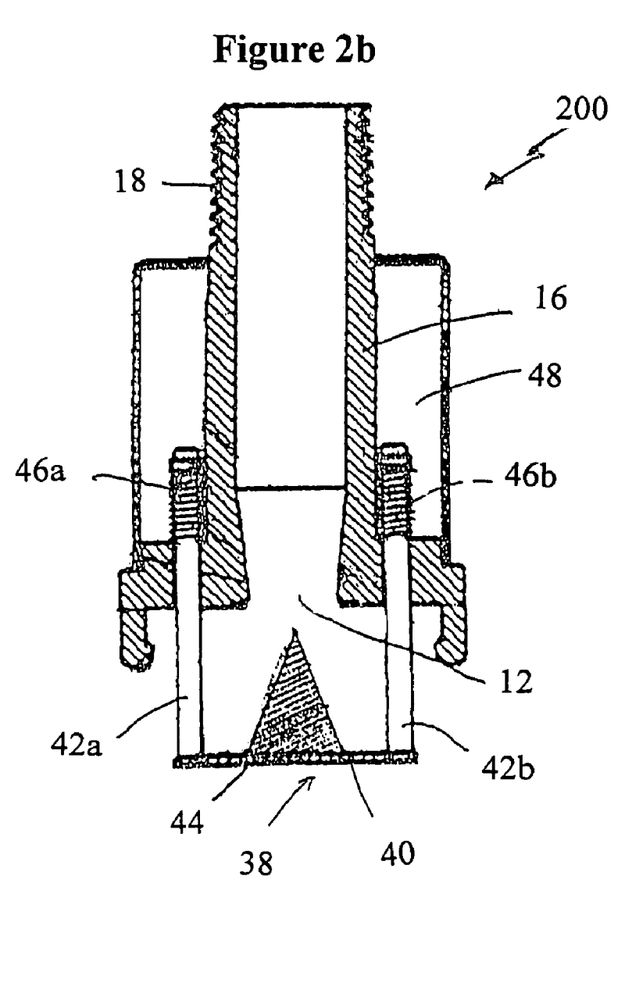
FIG. 2b schematically shows the automatic fire sprinkler of FIG. 2a, in a flowing condition.

Another preferred embodiment is illustrated in FIGS. 2a and 2b. Sprinkler 200 has a cylindrical body 16 with a threaded connection 18 attached to the water piping system (not shown in the drawing), a deflector 38 tightly closing body 16 in a non-flowing position, thereby preventing water flow through orifice 12 (shown only in FIG. 2b in an open position). Deflector 38 includes a cover 40, and two arms 42a and 42b that allow a free longitudinal movement of deflector 38, so as to increase and decrease the distance between deflector 38 and body 16, and spiral springs 46a and 46b wound around arms 42a and 42b. Springs 46a and 46b are contracted when sprinkler 200 is activated and water flows through orifice 12.

A conical element 44 is associated with the inner wall of cover 40. As the pressure of the water flowing through outlet 12 is decreased, springs 46a and 46b urge conical element 44 towards body 16. The cross-sectional area of the penetrating section of conical element 44 increases with decreasing pressure, thereby reducing the cross-sectional area of the water flow-path and further restricting the flow of water discharged by sprinkler 200.

Preferably, arms 42a and 42b and springs 46a and 46b are protected from external dirt and physical damages by an external box 48.

Referring to FIG. 2a, sprinkler 200 is described in a non-flowing position. Cover 40 of deflector 38 is tightly attached to body 16, and conical element 44 completely penetrates into body 16, closing orifice 12.

Despite the high water pressure of the fire protection system, cover 40 is kept tightly close to body 16 by a heat sensitive fusible element 36, thus preventing any water flow through sprinkler 200.

When a fire starts, and heat evolves from the burning materials, fusible element 36 fuses, cover 40 is urged out by the pressure, opening a gap between cover 40 and body 16 (FIG. 2b), conical element 44 is completely moved out of body 16, such that orifice 12 is, practically, at the maximum possible opening. Arms 42a and 42b are now at their extreme position outside box 48, and springs 46a and 46b are in a most restricted position.

Whenever one sprinkler is not sufficient for extinguishing the fire, more heat is evolved and more sprinklers are temperature-activated. Consequently, the water pressure in the system decreases and springs 46a and 46b pull back a part of arms 42a and 42b, thus decreasing the gap between cover 40 and body 16; part of conical element 44 penetrates into body 16, decreasing orifice 12 and the amount of water flowing through sprinkler 200. If additional sprinklers are activated, the process continues and the cross-sectional area of orifice 12 further decreases (i.e., the K-factor further decreases) according to the extent of the penetration of conical element 44 into body 16.

An additional preferred embodiment is shown in FIGS. 3a to 3e. In this embodiment, a conical element, inserted in any type of prior-art sprinkler, modifies the orifice of the sprinkler from constant to variable, thereby modifying a sprinkler having a constant K-factor into a variable K-factor sprinkler.

Figure 3A:
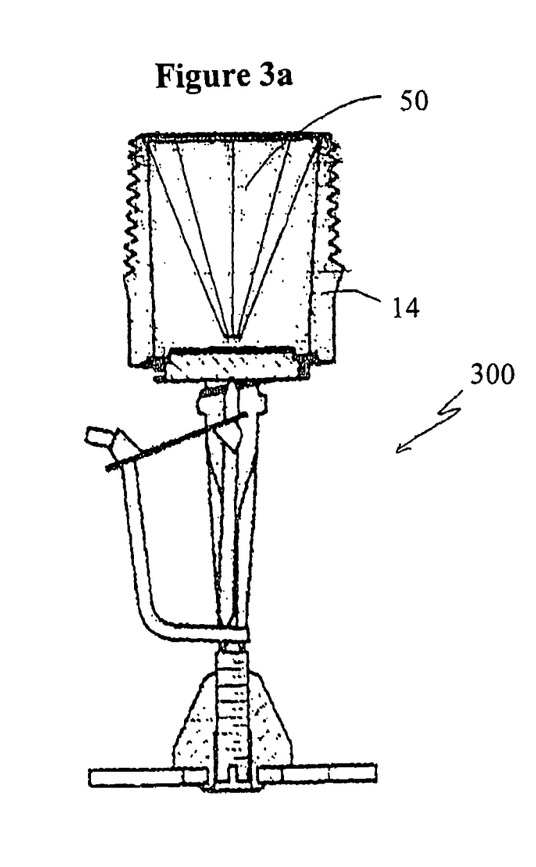
FIG. 3a schematically depicts a prior art sprinkler having an inserted conical element in the base for varying the orifice.

In FIG. 3a, conical, flow-impeding element 50 is inserted in a base 14 of a prior art sprinkler 300. This is preferably done during fabrication of the sprinkler. Conical element 50 is readily fabricated from a thin sheet of a flexible material, such as brass, natural or neoprene rubber, or a suitable plastic, such as Ethylene Propylene Diene Monomer (EPDM), which easily bends and, elastically returns to the original location according to the increase or decrease of an external force.

Figures 3B, 3C:
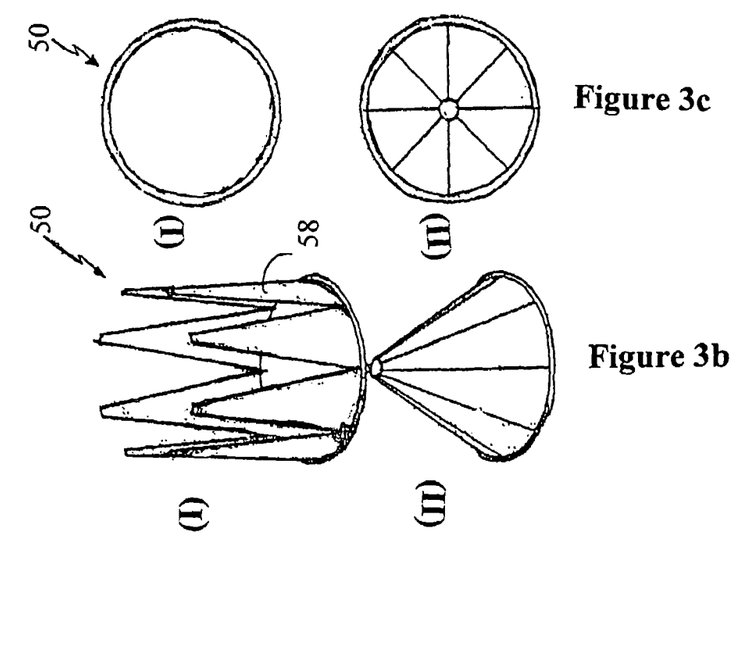
FIG. 3b is a perspective view of the conical element of FIG. 3a in flowing (I) and non-flowing (II) conditions.
FIG. 3c is a top view of the conical element of FIG. 3a in flowing (I) and non-flowing (II) conditions.
Figure 3D:
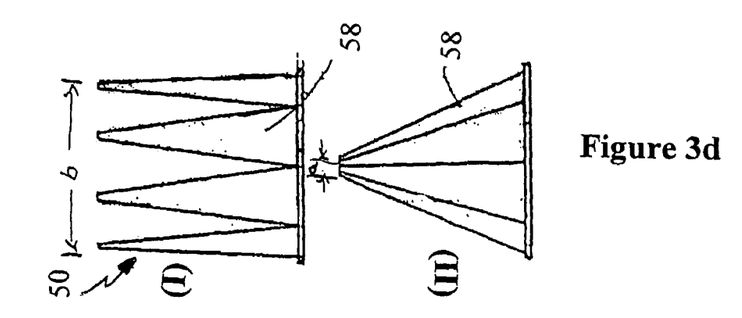
FIG. 3d is a side view of the conical element of FIG. 3a in flowing (I) and non-flowing (II) conditions.
Figure 3E:
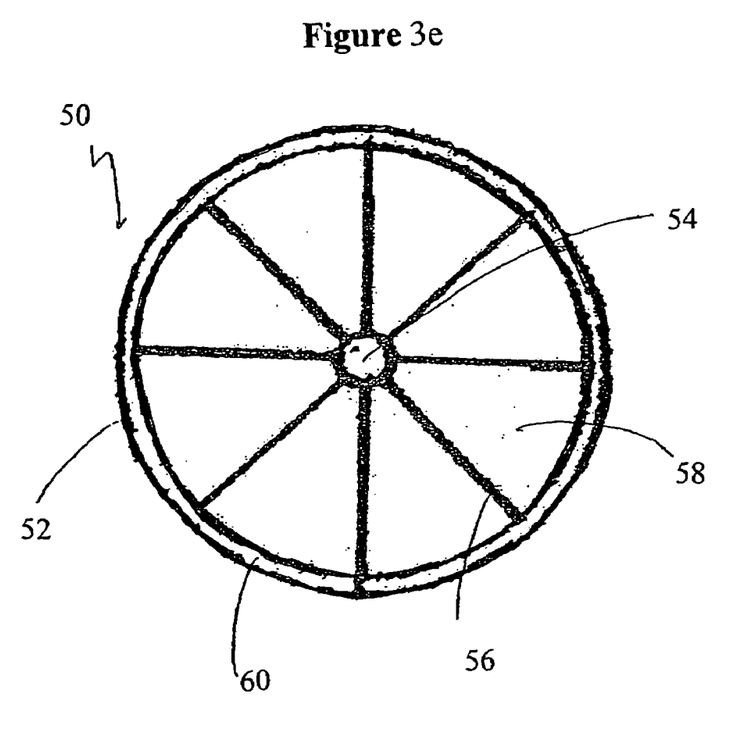

Referring now to FIG. 3e, FIG. 3e describes, in detail, a preferred construction process of conical element 50. A circle 52 having a diameter that substantially fits the internal diameter of base 14 is cut from a thin flexible sheet. A small circle 54 is cut out from the center of circle 52, and 4 to 32 (more typically 8 to 16), radial cuts 56 are cut in circle 52, leaving an uncut ring 60 in the outer perimeter of circle 52. Circle segments 58, formed by radial cuts 56, are then folded to form conical element 50.

Contrary to previously-described preferred embodiments, conical element 50 retains a conical shape when sprinkler 300 is not activated, due to the balanced water pressure inside and outside conical element 50.

FIGS. 3b to 3d show perspective, top, and side views, respectively, of conical element 50 in non-flowing (II) and flowing (I) positions. Segments 58 of the closed conical element 50, in a non-flowing (II) position, are opened to position (I) by the flowing water as soon as sprinkler 300 is temperature-activated. Opened segments 58, in a flowing position (I), change the shape of conical element 50 from a cone to a crown-like configuration. In this position, segments 58 are substantially parallel to the walls of base 14, and the actual orifice is the largest possible "b", in comparison to the smallest size "a" in closed position (II).

As more sprinklers are activated, the inlet pressure decreases and segments 58 start to close, equilibrating in some intermediate position between (I) and (II) with an orifice between "a" and "b". As additional sprinklers are triggered, this process continues, segments 58 further close, and the K-factor further decreases.

The capability to vary the orifice size, and gradually decrease the K-factor of sprinklers, which are self-adjusting with water inlet pressure, reduces the required water pressure at the inlet, and the amount of water and the number of sprinklers needed for extinguishing fires. This reduces the damages caused by excessive water, and obviates the need for installing more robust and expensive systems and tanks that require more power and maintenance.

Varying the orifice and K-factor, as demonstrated hereinabove, is feasible, simple and non-expensive. Sprinklers exhibiting K-factors that are self adjusting with water inlet pressure are obtained by inserting novel fittings ahead of existing sprinklers, by manufacturing sprinklers that have been slightly modified, or by other means that are readily known to those skilled in the art.

As explained hereinabove, the operational pattern of a sprinkler system is such that the sprinklers are individually activated according to the development of the fire. As the fire spreads and additional heat is evolved more sprinklers are temperature-activated, causing a drop in the water pressure, as well as in the quantity of water that is discharged through each sprinkler. Ultimately, rated water flow (Q) and pressure (p) values are reached when all the sprinklers discharge.

While this course of events also occurs with prior-art sprinklers having a constant orifice (or K-factor), it should be stressed that variable orifice sprinklers are much more efficient. The extinguishing capacity of a variable orifice sprinkler having an ultimate rated water flow (Q) and pressure (p) is equivalent to several prior art sprinklers having the identical fixed rated water flow (Q) and pressure (p). Hence, automatic fire protection systems that employ the current invention extinguish fires sooner, while using less water.

The desired function f(p) can be of various forms, such as, linear: $K=ap+b$, parabolic: $K=ap^2+b$, exponential: $K=ap^b+c$ and the like, where a, b, and c are constants. Function f and constants a, b, and c are calculated so as to maximize the water flow through the first sprinkler, and gradually decrease the flow to the required standard flow demand when additional sprinklers are activated. This required standard flow is determined by considering the specific design of the sprinkler, as well as by the fire hazard of the commodity to be stored, the material of construction of the warehouse, stacking height, etc.

As used herein in the specification and in the claims section that follows, the term "orifice" refers to an opening within a water flow-path, for limiting the water flow-rate of a sprinkler.

As used herein in the specification and in the claims section that follows, the term "water flow-path" refers to at least one flow course of water through a piping system that delivers water to at least one sprinkler of an automatic fire protection system, wherein the water flow-path is meant to specifically include the at least one sprinkler.

As used herein in the specification and in the claims section that follows, the term "specific water flow-path" refers to the last branch of a water flow-path feeding a single sprinkler.

Figure 4:
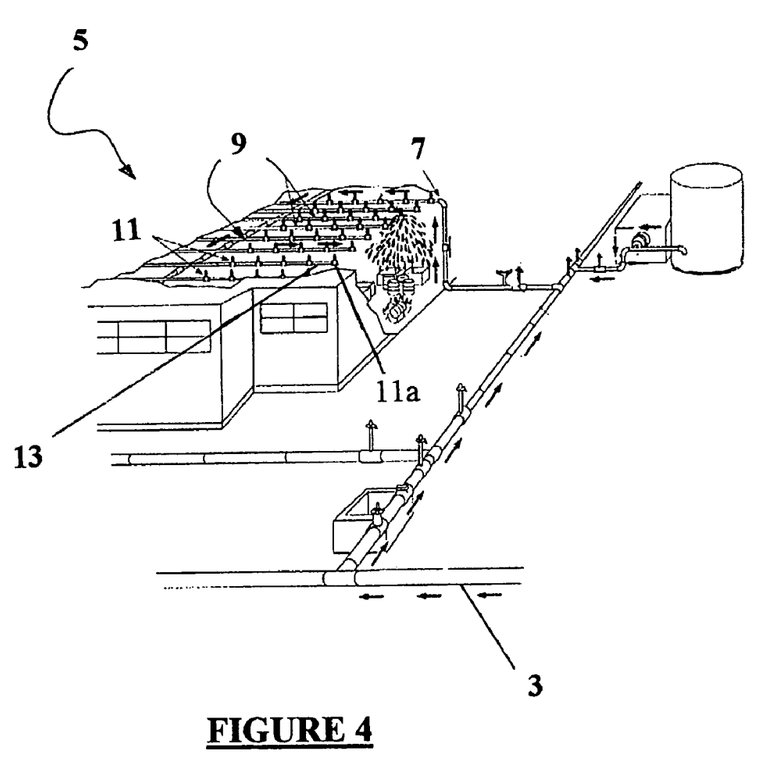
FIG. 4 is a schematic, perspective view of a conventional automatic fire sprinkler system.

FIG. 4 is a schematic, perspective view of a conventional automatic fire sprinkler system. Water is introduced to a conventional automatic fire sprinkler system 5 from a public water main 3, via a local feed main 7. A plurality of automatic fire sprinklers 11 is connected to local feed main 7 via branch lines 9. Typically, at least several automatic fire sprinklers 11 are disposed on each branch line 9.

The term "water flow-path", as defined hereinabove, refers to at least one flow course of water between local feed main 7 and at least one sprinkler of automatic fire sprinklers 11. The term "specific water flow-path", as defined hereinabove, refers to a last branch 13 of a water flow-path feeding a single automatic fire sprinkler 11a of automatic fire sprinklers 11.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An automatic fire sprinkler device comprising:
  a self-adjusting orifice associated with an automatic fire sprinkler, said automatic fire sprinkler having:
    a sprinkler housing defining a water inlet and a water outlet;
    a plug mechanism, attached to said sprinkler housing, and responsive to a thermally sensitive element,
  wherein said automatic fire sprinkler is adapted such that when said sprinkler is connected to an automatic fire sprinkler system, and when said sprinkler is in a standby configuration, a plug of said plug mechanism seals said housing so as to prevent a stream of water from discharging from said automatic fire sprinkler via said water outlet,
  and wherein said automatic fire sprinkler is further adapted such that when said sprinkler is connected to the fire sprinkler system, and when a temperature of said thermally sensitive element reaches a particular value, said plug is displaced with respect to said housing to achieve an activated configuration, in which:
    (i) said water inlet fluidly communicates with a water flow-path of the automatic fire sprinkler system;
    (ii) said stream of water passes through said water outlet and discharges from said automatic fire sprinkler, and
    (iii) said orifice self-adjusts in direct response to a water pressure acting on said orifice, so as to provide, as a function of said water pressure, a plurality of different, open cross-sections for said stream of water to pass therethrough, such that each open cross-section of said open cross-sections uniquely corresponds to a particular, unique water pressure acting on said orifice.

2. The automatic fire sprinkler device of claim 1, wherein, in said activated configuration, said orifice is adapted to self-adjust an open cross-section of said open cross-sections solely as a function of said water pressure acting on said orifice.

3. The automatic fire sprinkler device of claim 1, wherein said orifice includes a flow-impeding element for impeding said stream of water, such that in said activated configuration, said flow-impeding element is directly responsive to said water pressure acting on said orifice.

4. The automatic fire sprinkler device of claim 3, wherein, in said activated configuration, said flow-impeding element is self-adjusting, based on said water pressure, so as to decrease a cross-sectional area of said water flow-path as a function of a decrease in said water pressure, so as to maintain said orifice in an intermediately open position.

5. The automatic fire sprinkler device of claim 1, wherein each open cross-section of said open cross-sections represents a stable, equilibrium cross-section uniquely corresponding to said unique water pressure.

6. The automatic fire sprinkler device of claim 3, wherein said flow-impeding element is disposed within said automatic fire sprinkler.

7. The automatic fire sprinkler device of claim 3, wherein said flow-impeding element is anchored to said automatic fire sprinkler.

8. The automatic fire sprinkler device of claim 3, wherein said flow-impeding element is anchored to an inner wall of a deflector of said automatic fire sprinkler.

9. The automatic fire sprinkler device of claim 3, wherein said flow-impeding element includes a damping mechanism, said damping mechanism responsive to said water pressure.

10. The automatic fire sprinkler device of claim 1, wherein a flowrate of said water through said orifice is characterized by a formula:

$$Q=K*(p)^{1/2}$$

wherein Q is said flowrate, p is said water pressure, and

K is a coefficient dependent upon a geometry of said sprinkler,

K further being a function of said pressure p, so as to provide said plurality of open cross-sections.

11. The automatic fire sprinkler device of claim 6, wherein, in said activated configuration, said orifice is adapted to self-adjust an open cross-section of said open cross-sections solely as a function of said water pressure acting on said orifice.

12. The automatic fire sprinkler device of claim 6, wherein said orifice includes a flow-impeding element for impeding said flow, such that in said activated configuration, said flow-impeding element is directly responsive to said water pressure acting on said orifice.

13. The automatic fire sprinkler device of claim 6, wherein each open cross-section of said open cross-sections represents a stable, equilibrium cross-section uniquely corresponding to said unique water pressure.

14. The automatic fire sprinkler device of claim 6, wherein a flowrate of said water through said orifice is characterized by a formula:

$$Q=K*(p)^{1/2}$$

wherein Q is said flowrate, p is said water pressure, and

K is a coefficient dependent upon a geometry of said sprinkler,

K further being a function of said pressure p, so as to provide said plurality of open cross-sections.

15. The automatic fire sprinkler device of claim 6, wherein said flow-impeding element includes a flexible diaphragm.

16. The automatic fire sprinkler device of claim 15, said flow-impeding element further including a damping mechanism for damping movement of said diaphragm, said damping mechanism responsive to water pressure.

17. The automatic fire sprinkler device of claim 16, wherein said damping mechanism includes a piston.

18. The automatic fire sprinkler device of claim 16, wherein said damping mechanism includes a spring.

19. The automatic fire sprinkler device of claim 3, wherein said flow-impeding element is operatively connected to said automatic fire protection system.

20. The automatic fire sprinkler device of claim 19, wherein said flow-impeding element includes at least one leaf disposed within said water flow-path, said leaf configured so as to reduce said open cross-section as a function of a decreasing water pressure acting on said orifice.

21. The automatic fire sprinkler device of claim 20, wherein said at least one leaf is a plurality of leaves.

22. The automatic fire sprinkler device of claim 21, wherein said plurality of leaves shares a common base.

23. The automatic fire sprinkler device of claim 21, wherein said leaves are radial segments, said plurality of leaves designed and configured to move from an open configuration towards a closed configuration as a decreasing function of said water pressure, so as to reduce said open cross-section as a function of a decreasing water pressure acting on said orifice.

* * * * *